UNITED STATES PATENT OFFICE.

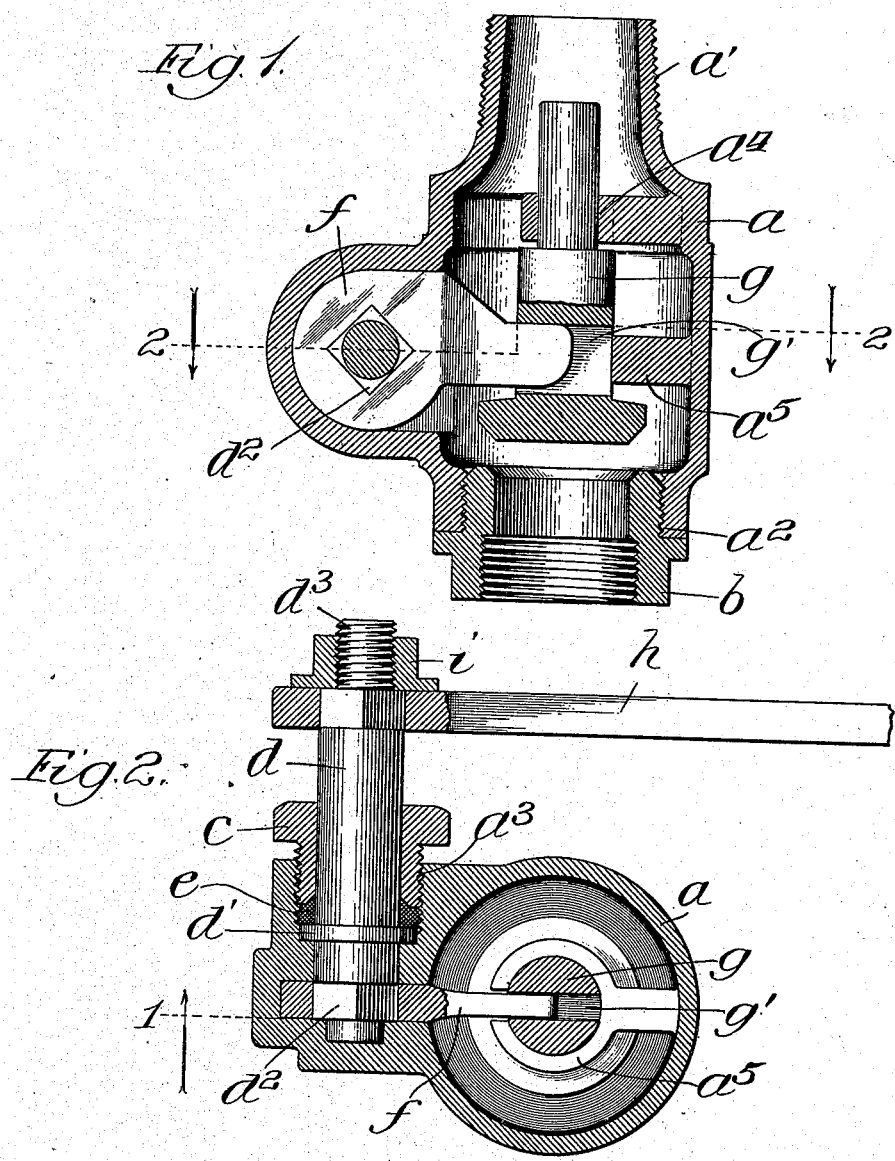

GUSTAVE H. OSMAN, OF TOPEKA, KANSAS.

BLOW-OFF COCK.

No. 900,197.      Specification of Letters Patent.      Patented Oct. 6, 1908.

Application filed October 8, 1906. Serial No. 338,028.

*To all whom it may concern:*

Be it known that I, GUSTAVE H. OSMAN, a citizen of the United States, residing at Topeka, in the county of Shawnee and State of Kansas, have invented certain new and useful Improvements in Blow-Off Cocks, of which the following is a specification.

My invention relates to blow-off cocks for use on locomotive boilers, and has for its object the provision of a valve or cock of this class which will afford simple and practical methods of manufacture and produce a device thoroughly strong, and one whose parts conform to shapes requiring the least expense to finish compatible with the requirements of this class of cocks.

My invention is illustrated in the accompanying drawing, in which—

Figure 1 is an assembled sectional elevation of the device. Fig. 2 is a section of the assembled device taken on the line 2—2 of Fig. 1.

Referring to the drawing, $a$ represents the inclosing shell, which is preferably of brass, and provided with the externally threaded portion $a'$ which is adapted to thread into the boiler of a locomotive or other steam engine. This shell is also provided with the internally threaded portion $a^2$ into which the valve seat $b$ is threaded and with the packing bearing portion $a^3$ into which the packing tap $c$ threads to make a steam tight joint about the shaft $d$. This shaft has the collar $d'$ formed thereon against which the packing $e$, which is preferably of asbestos fiber, presses to hold the shaft $d$ against longitudinal movement. This shaft $d$ has formed upon the inner end the square portion $d^2$ upon which is fitted the inner lever $f$. This lever $f$ extends into the cavity $g'$ within the valve plunger $g$ in such manner as to raise and lower the plunger out of registry and into connection with the valve seat $b$. Within the shell $a$ and integral therewith are the guideways $a^4$ and $a^5$ in which the valve $g$ is reciprocatingly mounted. Upon the outer end of the shaft $d$ the operating lever $h$ is secured in any desirable manner, preferably by squaring the end of the shaft and holding the lever $h$ in place by a nut $i$ threaded upon the extended end of the shaft $d^3$. It will be seen that by this construction the cock is very readily assembled and requires very little and very simple machine work to produce the finished device from the rough casting.

In operation, the portion $a'$ is threaded into the boiler, such that the pressure of steam and water in the boiler seats the valve $g$ tightly against the valve seat $d$. In order to open the valve, it is necessary to apply to the lever $h$ sufficient force to overcome the pressure of the steam upon the valve plunger, lever $f$ raising such plunger to allow the steam to pass through the valve.

The invention herein disclosed is illustrated and described with respect to details, though it is not my desire to be unduly limited thereto, it being understood that many variations from these details may be made without departing from the spirit or scope of my invention.

I claim:

In a blow-off valve, a casing provided with internal guide rings and having in axial alinement therewith inlet and outlet nozzles, and having further a side extension adapted to support a transverse shaft, a valve member at one end of the casing connected to a valve stem embraced by said guide rings, a shaft in said external support, and an arm projecting from the inner end of said shaft and engaging the valve stem, one of said guide rings being split to admit the said arm to the said valve stem.

GUSTAVE H. OSMAN.

Witnesses:
JOHN PURCELL,
FRANK CAIN.